Figure 1:
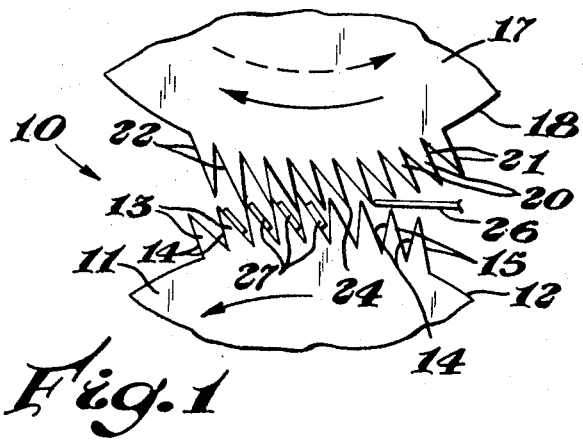

United States Patent

[11] 3,583,267

| [72] | Inventor | Alvin S. Topolski<br>Midland; Walter A. Trumbull,<br>Sanford, both of Mich. |
|---|---|---|
| [21] | Appl. No. | 590,903 |
| [22] | Filed | Oct. 31, 1966 |
| [45] | Patented | June 8, 1971 |
| [73] | Assignee | The Dow Chemical Company<br>Midland, Mich. |

[54] METHOD AND APPARATUS FOR PELLETIZING OF PLASTIC MATERIALS
7 Claims, 4 Drawing Figs.

[52] U.S. Cl. ..................................................... 83/15,
83/37, 83/42, 83/171, 83/339, 83/345, 83/906
[51] Int. Cl. ....................................................... B26d 7/10,
B26d 1/40
[50] Field of Search ............................................ 241/236,
42; 83/37, 345, 339, 906, 913, 16, 15, 171, 694,
674; 18/1 B, 2 J

[56] References Cited
UNITED STATES PATENTS

| 2,221,022 | 11/1940 | Ellis ............................. | 83/345X |
| 2,234,976 | 3/1941 | Muntwyler ................. | 83/345X |
| 2,257,336 | 9/1941 | Feurt ........................... | 83/674X |
| 3,137,184 | 6/1964 | Meyers ........................ | 83/171X |

FOREIGN PATENTS

| 812,759 | 4/1959 | Great Britain ................ | 83/906 |

Primary Examiner—Frank T. Yost
Attorneys—Griswold and Burdick, Robert B. Ingraham and William D. Miller ABSTRACT: Soft plastic strands are cut by means of opposed ratchet-type gears which have intermeshing generally radially extending faces of gear teeth. Such cutters are generally simple and self-cleaning.

PATENTED JUN 8 1971

3,583,267

INVENTORS.
Alvin S. Topolski
BY Walter A. Trumbull

AGENT

METHOD AND APPARATUS FOR PELLETIZING OF PLASTIC MATERIALS

This invention relates to a method and apparatus for pelletizing plastic materials, and more particularly relates to an improved method of pelletizing plastic materials wherein strands are sheared into a plurality of pellets or granules.

Beneficially, many synthetic resinous thermoplastic materials are handled in the form of granules or pellets which are subsequently employed for injection molding, extrusion or other heat fabrication operations. Generally, such granules, particles or pellets are desirably of relatively uniform size and shape, flow readily and can be subsequently removed from equipment when it is desired to change from one variety of material to another. Usually, it is particularly beneficial that such particles have relatively uniform, nonrectangular geometry and that a mass of such particles does not contain particles of widely differing size. Frequently, the presence of finely divided particles among larger beads gives rise to undesirable contamination of equipment and conveyor lines as well as nonuniformity in the resultant molded product. Many synthetic resinous materials such as polystyrene are relatively brittle, while others such as rubber reinforced polystyrene, polyethylene and the like are tough and somewhat flexible. Beneficially, such resinous materials are formed into pellets by extrusion from a plurality of openings to form strands or fibers which are cooled below the thermoplastic temperature and fed into a grinding or comminuting apparatus usually operating at relatively high speed which severs the strand or particle, oftentimes by impact of a rapidly moving knife such as a rotary knife against a fixed knife. Generally, when handling synthetic resinous thermoplastic materials, it is desirable to maintain relatively low rates of motion in order to avoid heating or reheating of the synthetic resinous material by friction and causing agglomeration and to avoid high impact speed which causes shattering and irregular particle formation.

It would be desirable if there were available an improved method and apparatus for the preparation of synthetic resinous thermoplastic pellets and strands.

It would also be beneficial if such a method and apparatus were capable of producing a relatively large volume of pelletized material without impact.

It would be beneficial if there were available a continuous process for converting synthetic resinous thermoplastic strands into pellets in a continuous manner using a shearing process.

These benefits and other advantages in accordance with the present invention are achieved by providing a strand of synthetic resinous material, passing the strand between a pair of generally circular rotatable configurations, the pair of rotatable configurations comprising a first configuration and a second configuration, each of the configurations having intermeshing shearing edges and being driven by an external power source, the circular configurations being rotated about their axes of generation thereby dividing the strand into a plurality of pellets.

Also contemplated within the scope of the present invention is an apparatus for pelletizing synthetic resinous thermoplastic materials which are readily served by shear, the apparatus comprising means to provide at least a strand of synthetic resinous material, first and second shearing drums, each of the shearing drums having an axis of rotation and rotatably mounted by a support means in adjacent generally parallel relationship, each of the shearing drums defining a plurality of peripheral teeth of like pitch, each of the teeth on each of the drums having an asymmetric configuration, each of the teeth having a generally radial face, the drums being so constructed and arranged that the generally radial faces of teeth of the first and second drums engage, means to rotate the first drum in such a manner that the generally radial faces of the teeth are leading, means to synchronize the teeth of the first and second drums to maintain shearing relationship and means to feed the strand between the drums and thereby shear the strand into a plurality of pellets.

Further features and advantages of the present invention will become more apparent from the following specification when taken in connection with the drawing wherein:

In FIG. 1 there is schematically illustrated the preparation of pellets in accordance with the present invention.

Figure 2:
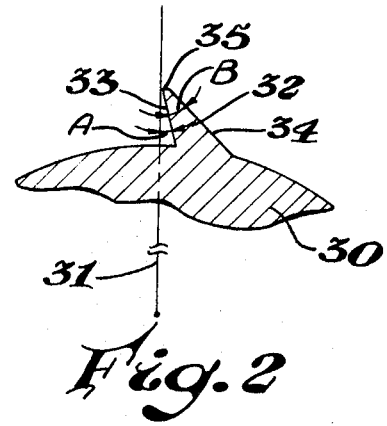

FIG. 2 schematically depicts a tooth configuration suitable for shearing in accordance with FIG. 1.

Figure 3:
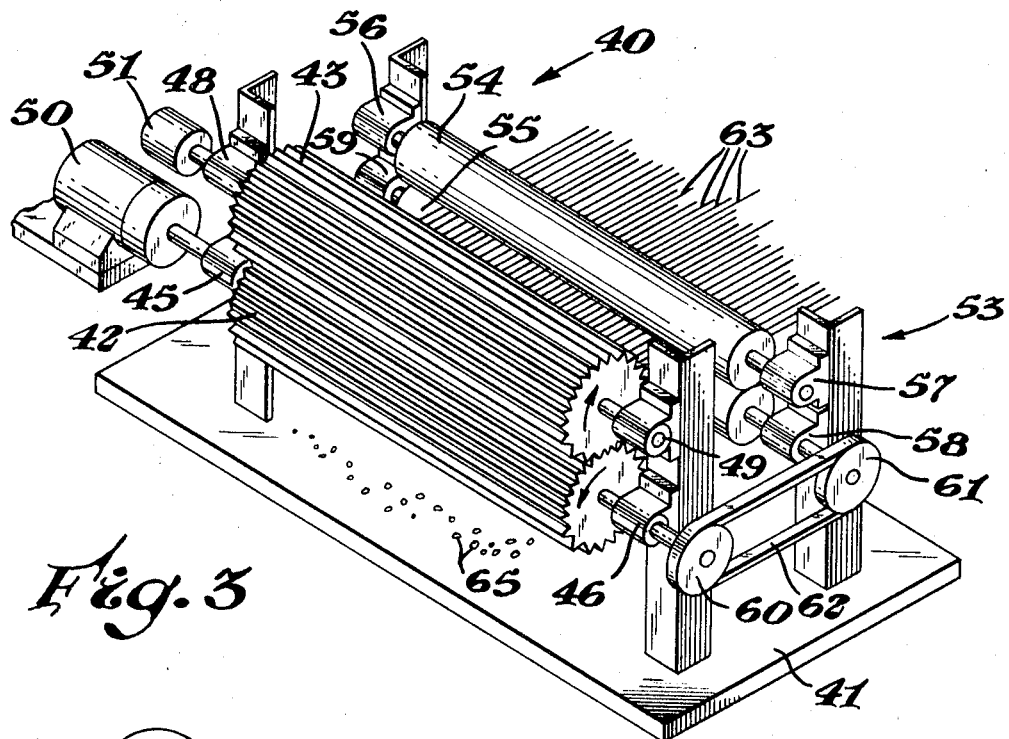

FIG. 3 schematically depicts an apparatus in accordance with the present invention.

Figure 4:
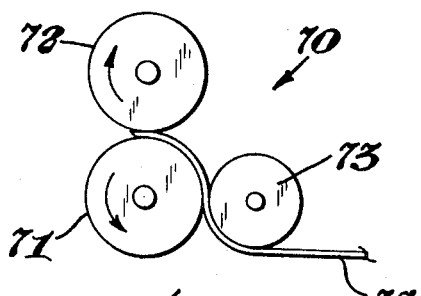

FIG. 4 depicts an alternate feed configuration.

In FIG. 1 there is schematically depicted a shearing apparatus in accordance with the invention generally designated by the reference numeral 10. The apparatus 10 comprises a first or driven roll 11 having a generally cylindrical surface 12. Disposed on the generally cylindrical surface 12 is a plurality of teeth 13. The teeth 13 have leading or radial faces 14 and trailing or nonradial faces 15. A second roll 17 having a generally cylindrical surface 18 is rotatably disposed adjacent the first roll 11. The surface has disposed thereon a plurality of teeth 20 having a generally radially extending face 21 and a leading face 22. The rolls 11 and 17 form a nip 24 wherein the generally radial faces 14 and 21 engage. A strand 26 is shown disposed in the nip 24 and pellets or particles 27 are disposed on the faces 15 of the teeth 13. The roll 11 is driven by an external source not shown in the direction indicated by the arrow. The roll 17 is driven in the direction indicated by the arrow by the roll 11 through engagement of the radial faces 14 and 21 of teeth 13 and 20, respectively. A braking or motion-retarding force is applied to the roll 17 in the direction indicated by the dotted arrow to provide a means of synchronizing the teeth of the rolls 11 and 17.

In FIG. 2 there is schematically depicted a sectional view of a portion of a drum 30 having a radius 31 and a tooth 32. The tooth 32 has a first or engaging face 33 and a second or nonengaging face 34. The tooth remote from the drum 30 terminates in a flat or cylindrical surface 35. The angle designated as A is the relief angle of the tooth and the angle designated as B is the included angle of the tooth. Beneficially, for the practice of the method in construction of the apparatus in accordance with the invention, the relief angle of such teeth is from zero to about 30°, while the included angle is from about 10°—45° and the flat 35 may vary from 0.000° to 0.10°.

In FIG. 3 there is a schematic representation of an apparatus in accordance with the present invention generally designated by the reference numeral 40. The apparatus 40 comprises a frame or support means 41. The support means 41 has disposed thereon a first shearing roll 42 and a second shearing roll 43. The first shearing roll 42 is supported by means of the journals or bearings 45 and 46. The roll 43 is supported by the bearings 48 and 49. The rolls 42 and 43 have an axially extending toothed configuration generally as depicted in FIG. 1. The first roll 42 is driven in a direction indicated by the arrow by means of the motor 50. A synchronizing means or brake 51 is operatively connected to the roll 43 to retard motion imparted to it by the roll 42. A feed roll assembly 53 is disposed generally adjacent the rolls 42 and 43. The feed roll assembly 53 comprises a first roll 54 and a second roll 55. The rolls 54 and 55 are supported on the frame 41 by bearings 56, 57, 58 and a fourth bearing 59. Affixed to the roll 42 is a pulley 60. A variable speed or variable effective diameter pulley 61 is affixed to the roll 55. The pulleys 60 and 61 are operatively joined by a power transmission means or belt 62. A plurality of resin strands 63 have been fed into the feed assembly 53 and a plurality of particles or pellets 65 are discharged from the roll 42.

In FIG. 4 there is schematically depicted an alternate arrangement of a cutter in accordance with the present invention, generally designated by the reference numeral 70. The cutter 70 comprises a first driven roll 71 and a second roll 72. The rolls 71 and 72 have a toothed configuration generally similar to that of FIG. 1 and omitted for the sake of clarity. A feed roll 73 is disposed adjacent the first roll 71 and a strand or plurality of strands 75 is frictionally engaged between the roll 73 and the roll 71. The arrangement of FIG. 4 is particularly beneficial and advantageous where it is desirable to employ rolls of relatively small diameter, that is, of relatively few teeth.

In each of the embodiments of the present invention, severing of the strands is accomplished by shearing between adjacent and generally mating teeth. Generally, it is desirable to employ strands of a relatively soft material. By the term "soft material" is meant a material which, when formed into a cylindrical rod having a length to diameter ratio of 6:1, may be bent through an angle of 30° without fracturing into two separate pieces, the tests being conducted at a desired cutting temperature. Generally, materials which rupture on bending 30° are often more desirably handled by fracturing in other manners. The cutting speed of the apparatus in accordance with the present invention may be varied within wide limits. Shearing occurs readily at speeds which are oftentimes considered impractical and as low as about 1 foot per minute or less and excellent shearing is obtained at speeds up to at least 2000 feet per minute.

Advantageously, the method and apparatus of the present invention is beneficially employed to cut brittle material which is tough and rubberlike or material which at low temperatures is brittle and softens at higher temperatures. Such diverse materials as polystyrene at a temperature of 225° F., uncured rubber at room temperature, plasticized polyvinyl chloride, rubber-modified polystyrene, rubber-modified polyvinyl methyl methacrylate and the like are readily formed into pelletized materials. The only critical physical property of the synthetic resinous material to be cut in accordance with the method and apparatus of the present invention is the bending test hereinbefore described. Advantageously, relatively low viscosity materials are handled at elevated temperatures by applying a water spray or layer to the cutting rolls which serves to chill the surface thereof and prevent adherence of particles to the surface. Advantageously, any cooling fluid may be employed including air, nitrogen, alcohol and the like. Beneficially, when severing particularly viscid synthetic resinous materials, it is oftentimes desirable to apply a mold release composition to the surface of the rolls such as polysiloxane compositions and an alternate cooling means may be employed such as a water bath, gas cooling or the like.

In operation of the apparatus of the present invention, it is particularly critical that the relationship between the rolls as depicted in FIG. 1 is maintained. Therefore, it is usually necessary in order to maintain the desired tooth faces in engagement that an additional synchronizing means or breaking force, drag or rotation retarding means be provided other than the bearings necessary for the support of the rolls. The synchronizing braking force required is generally greater as harder strands are employed than when strands of softer material are utilized. When the first roll is utilized to drive the second roll, the transfer of power from the first or driven roll to the second roll through the teeth is of intermittent nature, at some speeds, vibration will develop which will cause the faces of opposed teeth on adjacent rolls to be other than in desired relationship. Such motion is prevented by synchronization or a braking force. Beneficially when high speed operation is desired the synchronizing or braking force is supplied by connecting the driven roll to the driving roll by external synchronizing gears such as spur gears to assure proper intermeshing of the teeth.

By way of further illustration, employing an apparatus substantially as depicted in FIG. 3 employing a tooth configuration generally in accordance with FIG. 2 wherein the angle A is zero and B is 45°, both the first roll and second roll have 82 teeth each spaced 0.140 inch, about 0.135 inch deep and a terminal flat on each tooth of 0.005 inch. A blend of 50 weight percent polyteritiary butyl styrene and 50 weight percent polyvinyl chloride was cooled in a 15 foot water bath while travelling at a rate of 40 feet per minute. The strands (0.140 inch in diameter) fed to the pelletizing apparatus were cut into uniform pellets with no significant indication of undersized pellets, oversized pellets or two or more pellets adhering together in saw-toothed configuration. Similar beneficial results are obtained when employing cutting speed of 2000 feet per minute.

In apparatus similar to the foregoing illustration with the exception that the angle A is 10°, the angle B 30° and the flat 35 and the width 0.010 inch, freshly extruded polystyrene at a temperature of 245° F. is pelletized with the addition of a water spray to the rolls.

Similar beneficial and advantageous results are obtained employing rubber-modified polystyrene, graft copolymers of styrene and rubber, rubber-modified polymethyl methacrylate.

Employing apparatus wherein the rolls are fabricated from steel, extensive operation indicates no significant wear. The only indications of wear which are observed are when high speed operation is adapted without applying an adequate synchronizing force means.

Beneficially, employing the feed arrangement of FIG. 4 with the hereinbefore described rolls, higher speed operation is obtained with less chance of nonuniformity.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What I claim is:

1. A method of pelletizing a strand of synthetic resinous thermoplastic material, the method comprising:

providing a strand of synthetic resinous thermoplastic material to be cut into pellets, the strand having a longitudinal axis, passing the strand generally tangentially between a pair of generally circular rotatable configurations, the pair of rotatable configurations comprising a first configuration and a second configuration, each of the configurations having a plurality of intermeshing shearing teeth, each of the teeth having a generally radial engaging face and a nonradial nonengaging face, the engaging face and nonengaging face defining an included angle therebetween of from 10° to 45° and the radial face a relief angle of from 0° to 30°, the engaging face of each tooth being immediately adjacent a nonengaging face of an adjacent tooth, the configurations being driven by an external power source, the circular configurations being rotated about their axes of generation thereby dividing the strand into a plurality of pellets.

2. The method of claim 1 wherein the synthetic resinous material is a rubber-modified polystyrene.

3. The method in accordance with claim 1 including the step of applying coolant to the surface of the configurations.

4. The method of claim 1 wherein a plurality of strands of synthetic resinous material are passed between the configurations in generally parallel arrangement.

5. An apparatus for pelletizing synthetic resinous thermoplastic materials which are readily severed by a shearing force, the apparatus comprising means to provide at least a strand of synthetic resinous material, first and second shearing drums, each of the shearing drums having an axis of rotation and rotatably mounted by a support means in adjacent generally parallel relationship, each of the shearing drums defining a plurality of peripheral teeth of like pitch, each of the teeth of each of the drums having an asymmetric configuration, each of the teeth having a generally radial engaging face and a nonengaging face, the engaging face defines a relief angle of from 0° to 30°, the included angle of the engaging and nonengaging faces is from about 10° to about 45°, the engaging face of a tooth being immediately adjacent a nonengaging face of an adjacent tooth, the drums being so constructed and arranged that the engaging faces of the teeth of the first and second drums engage as the drums are rotated, means to rotate the drums in such a manner that engaging faces of the teeth of the first drum are leading, means to synchronize the teeth of the first and second drums to maintain shearing relationship, means to supply the strand generally tangentially between the drums and thereby shear the strands into a plurality of pellets.

6. The apparatus of claim 5 wherein the teeth terminate in a generally flat surface having a width of up to about 0.10 inch.

7. The apparatus of claim 5 including a rotatably disposed roll adjacent the first drum and rotating generally parallel thereto, the roll adapted to frictionally engage a plurality of strands between the roll and the first drum.